United States Patent [19]

Rodda et al.

[11] 3,848,084

[45] Nov. 12, 1974

[54] STORAGE TUBE CONTROL APPARATUS FOR A TELEPHONE IMAGE TRANSMISSION SYSTEM

[75] Inventors: William E. Rodda, Trenton, N.J.; Denis Peter Dorsey, Levittown, Pa.

[73] Assignee: RCA Corporation, New York, N.Y.

[22] Filed: Mar. 23, 1973

[21] Appl. No.: 344,067

[30] Foreign Application Priority Data

Apr. 24, 1972 Great Britain .................... 19022/72

[52] U.S. Cl....... 178/6.8, 178/DIG. 3, 178/DIG. 24, 179/2 TV

[51] Int. Cl........................... H04n 5/02, H04n 7/12

[58] Field of Search......... 178/6.8, DIG. 3, DIG. 24, 178/7.5 SE; 179/2 TV

[56] References Cited

UNITED STATES PATENTS

| | | | |
|---|---|---|---|
| 3,061,670 | 10/1962 | Oster | 178/6.8 |
| 3,037,083 | 5/1962 | Inouye | 178/6.8 |
| 3,204,026 | 8/1965 | Doundoulakis | 178/6.8 |
| 3,251,937 | 5/1966 | Hoag | 178/6.8 |
| 3,401,299 | 9/1968 | Crowell | 178/6.8 |
| 3,497,614 | 2/1970 | Petrocelli | 178/7.5 SE |

OTHER PUBLICATIONS

IBM Technical Disclosure Bulletin, Vol. 11, No. 3, August 1968, p. 247.

*Primary Examiner*—Howard W. Britton
*Attorney, Agent, or Firm*—Eugene M. Whitacre

[57] ABSTRACT

The disclosed apparatus provides vertical deflection signals of three scanning rates for a storage tube employed in a communication system in which a telephone line carries picture representative audio frequency signals between transmitting and receiving locations. Whereas each of these three scanning rates are utilizable to control the storage tube to reproduce an image at the receiving location, only two of the scanning rates are needed to control the storage tube in transmitting the image onto the line.

7 Claims, 3 Drawing Figures

STORAGE TUBE CONTROL APPARATUS FOR A TELEPHONE IMAGE TRANSMISSION SYSTEM

FIELD OF THE INVENTION

Pending U.S. Pat. Application Ser. No. 257,412, filed May 26, 1972, and entitled "TELEPHONE IMAGE TRANSMISSION SYSTEM" (RCA 64,997) describes a system which is capable of transmitting television pictures of three-dimensional objects over communications channels such as long-distance unequalized voice-grade telephone lines. A television camera is therein employed to continually provide a video signal to a storage tube in which any one video frame of information can be "frozen." The single frame stored—i.e., the picture to be transmitted—is then converted to an audio frequency signal for transmission over television type communications links to a remote receiver location, where a second storage tube is used to store the audio frequency information transmitted. Upon completion of the transmission, the audio information stored at the receiver is converted back to a video signal for viewing on a monitor. The transmitted signal is essentially frequency modulated, in that its instantaneous frequency is directly proportional to the brightness level of the stored picture element then being transmitted.

Such a transmission system has been termed "simplex," in that transmissions always travel in the same direction along the telephone link. In a "half-duplex" system, on the other hand, transmissions can proceed in either direction, but not simultaneously. As described, such a system is particularly attractive for use where the picture being transmitted is a "frozen" image of a moving object. In this "snapshot" mode of operation, the television camera is operated at its normal, television vertical scanning rate, with the moving object being viewed on a monitor and with the image representative signal information being written into storage at conventional horizontal and vertical rates. The image is thereafter read from storage and transmitted along the communications link to the receiver location, where a second storage tube is employed to re-create such information signals and display them on a second monitor, again at conventional horizontal and vertical rates. Thus, in this mode of system operation, the storage tube—when being written into for transmission purposes or when being read from for display purposes—is operated at normal, 60 Hz vertical scanning rates.

As is also described, enhanced performace of the system results when the stored image is read onto the telephone line at approximately one-fourth the vertical scanning rate. A second, 15 Hz vertical scanning rate is thus also desirable. It has been additionally determined that where the system is to transmit pictures of "stationary" objects, increased resolution can be had by bypassing the storage tube and reading directly from the television camera onto the telephone line. The vertical deflection rate for the camera in this mode is reduced from 60 Hz to 7½ Hz, and the writing into the storage tube at the receiver should similarly be at this same 7½ Hz vertical rate. A third vertical scanning rate for the storage tube, namely 7½ Hz, is thus additionally desirable, utilizable, however, only in the re-creation of a transmitted image.

SUMMARY OF THE INVENTION

As will become clear hereinafter, the present invention includes a resistance-capacitance time constant network to provide a sawtooth voltage waveform whose duration conforms with the scanning rate of the vertical deflection signals applied to control the storage tube. In one manner of operating the invention, the capacitor is discharged at a rate dependent upon the desired vertical frequency. The impedance value of the network resistance is controlled at the same time to adjust the slope of the developed sawtooth and ensure continued scansion of the target elements of the storage tube, regardless of the frequency selected. The apparatus can thus provide a first slope of sawtooth signal for a 60 Hz waveform, and an increased slope as the frequency is reduced—first, to a 15 Hz rate and, second, to a 7½ Hz rate.

As will be seen, the 60 Hz rate is employed to write information signals into the storage tube prior to transmission along the telephone line, and to read information signals from the storage tube at the receiving location for display on a television type monitor. The 15 Hz rate, on the other hand, is utilized both to read "frame-freeze" information sigals from the storage tube at the transmitting location onto the telephone line and to write such signals into the storage tube at the receiving location. Where the television camera applies the "stationary" object information signals directly onto the telephone line, the 7½ Hz rate is used to write such signals into the storage tube at the receiver. The need for three such scanning rates for complete storage tube control follows the realization that it is employed in transmitting picture images and in their reproduction, although not at the same time—i.e., in a "half-duplex" mode of system operation.

BRIEF DESCRIPTION OF THE DRAWINGS

These and other features of the present invention will be more clearly understood from a consideration of the following description taken in connection with the accompanying drawing in which.

DETAILED DESCRIPTION OF THE DRAWINGS

Figure 1:
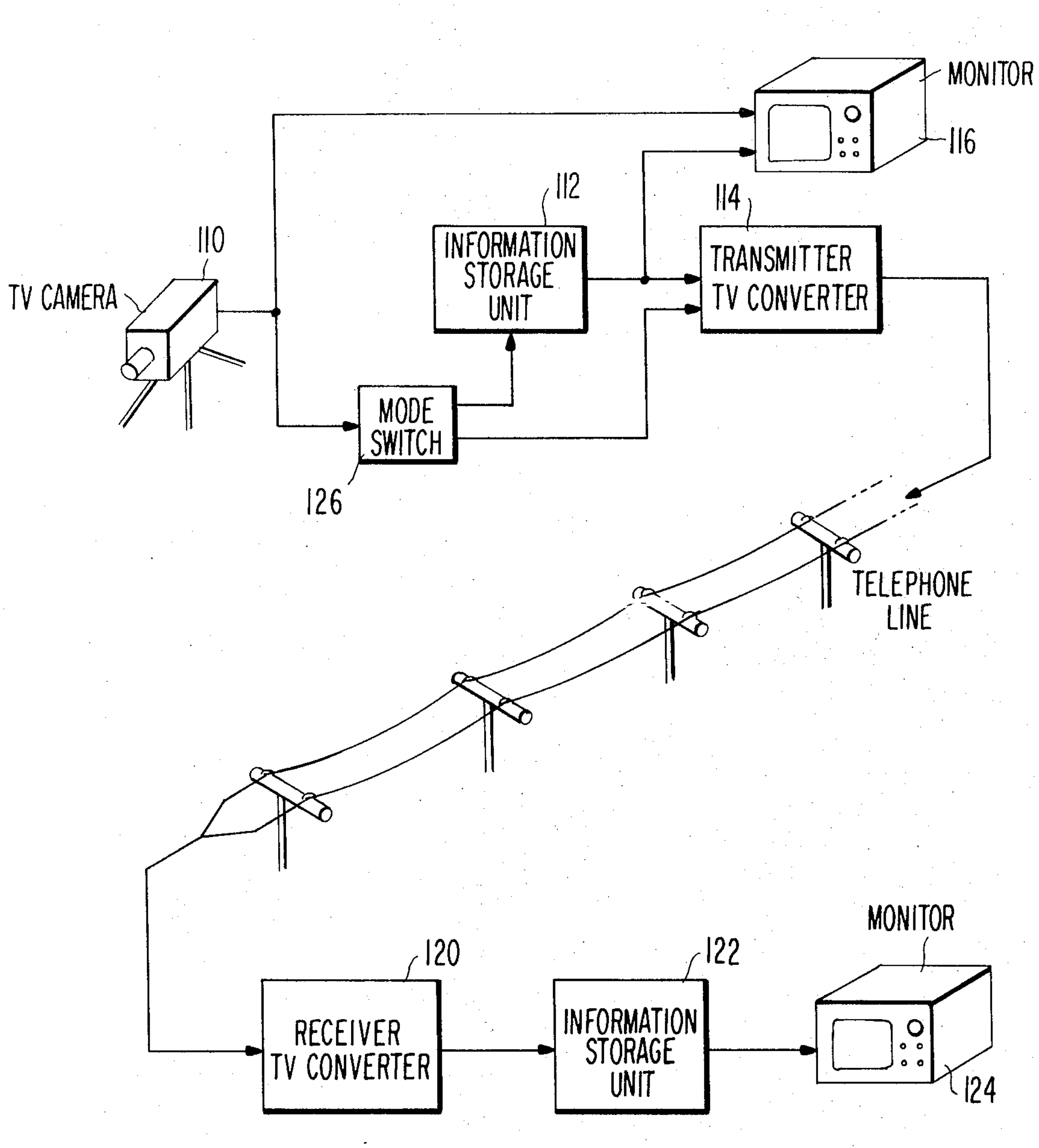
FIG. 1 is a block diagram of a television image transmission system of the type described in the pending application Ser. No. 257,412.

A telephone image system of the type described in the Ser. No. 257,412 application will be seen to include a television camera 110, a storage tube 112 coupled to the output of the camera 110, and a first converter 114 for changing the video signal applied to it from the storage tube 112 to an audio frequency signal to be applied to a telephone line, for example. A monitor 116 is also included, having an input terminal coupled to the output of camera 110 and a second input terminal coupled to the output of storage tube 112, by means of which an object scene can be viewed.

Also illustrated at the output of the telephone line is a second converter 120 for receiving the audio signal and for converting it to pulse modulated information representative of both the audio frequency and of the elemental brightness of the picture elements converted by the unit 114 to that form of information content. Such pulse information is applied to a second storage tube 122 until a full representation of the transmitted image is received, after which a second monitor 124 is activated to display the stored image of the unit 122 to complete the transmission.

Additionally shown in FIG. 1 is a control switch 126 which, for a "frame-freeze" mode of system operation, couples moving object images from the television camera 110 to the storage tube 112 prior to application to the converter 114 and which, for a "stationary" mode of system operation, couples still object images directly from the television camera 110 to the converter 114, the storage tube 112 then being disconnected from the television transmission system.

In this "frame-freeze" mode of operation, image signals are written into the storage tube 112 at a conventional 60 Hz vertical scanning rate. To match the bandwidth characteristics of the telephone line, those signals are read from the tube 112 onto the line at a 15 Hz rate. In the "stationary" mode of system operation, where the storage tube 112 is bypassed, the vertical scanning rate for the camera 110 is reduced to 7½ Hz, to increase vertical resolution and provide improved detail for image signals representative of maps, blueprint drawings, schematic diagrams, etc.

Considering the storage tube 122, on other othe hand, it will be seen that a 60 Hz vertical rate is needed to read information from its target onto the receiving monitor 124. It will also be noted that both 15 Hz and 7½ Hz vertical scanning rates are also needed to write into its storage those image signals received along the telephone line. Because a single storage tube can be used in a "half-duplex" mode to perform a transmitting function at one instant of time and a receiving function at a second instant, complete control of the imaging system necessitates the availability of these three vertical scan rates for operating the storage tube in a "receive" condition, whereas only the 60 Hz and 15 Hz rates are needed in a "transmit" arrangement.

Figure 2:
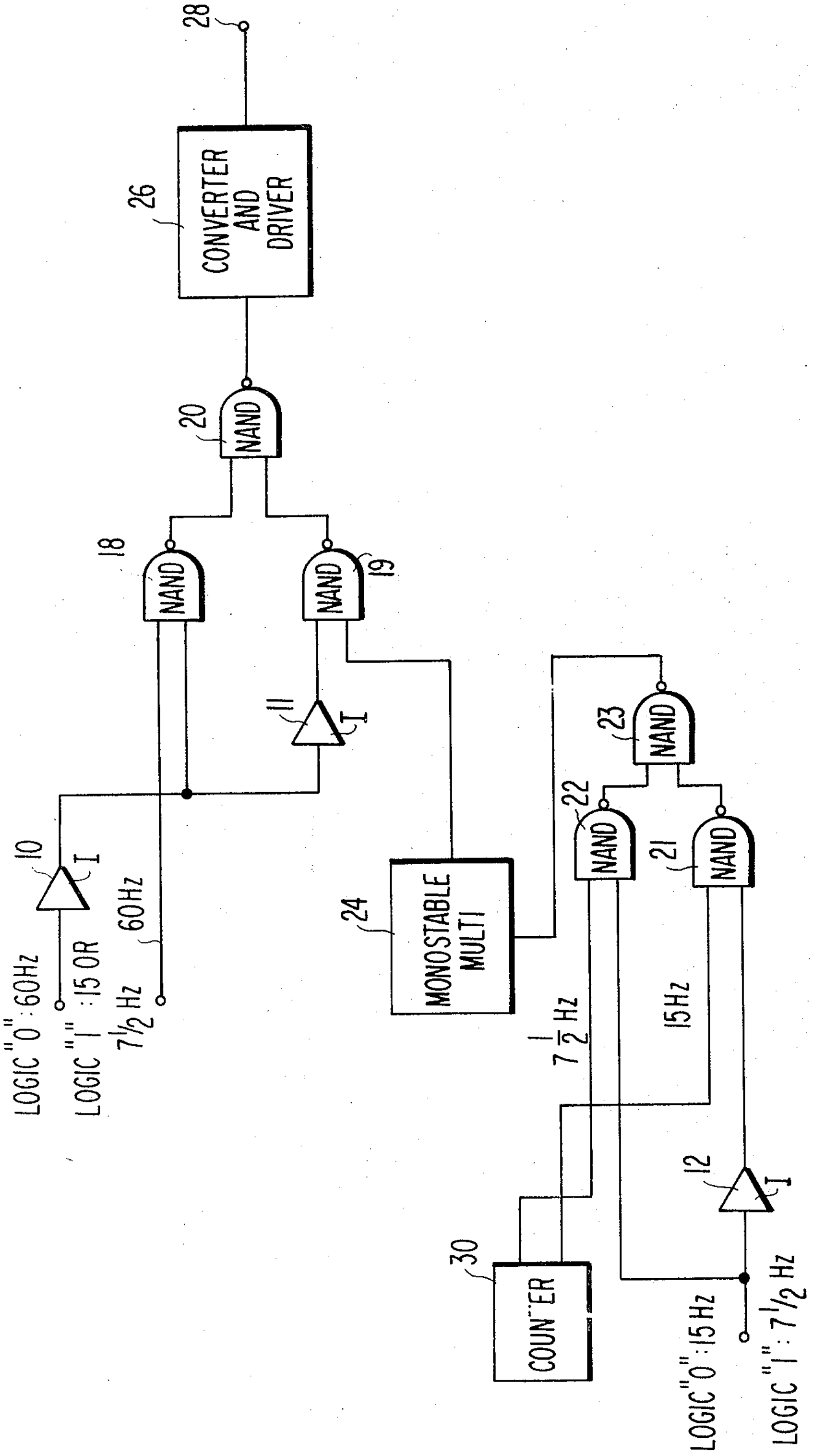
FIG. 2 is a block diagram of apparatus for developing control pulses necessary in the operation of the present invention.

The apparatus of FIG. 2 includes three inverter stages 10–12, six two-input NAND gates 18–23, a pulse shaping circuit 24, and a converter and driver circuit 26. As shown, the output terminal of inverter 10 is coupled, first, to one input of NAND gate 18 and, second, to the input of inverter 11. The output terminal of inverter 11 is, in turn, coupled to one input of NAND gate 19, to the other input of which is coupled and output of the pulse shaping circuit 24 (indicated as being of monostable multivibrator construction), arranged to provide pulses at either a 7½ or 15 Hz rate. As will be seen below, such pulse train may be developed from a synchronizing generator (not shown), for example, which is also effective in providing a 60 Hz pulse train to the second input of NAND gate 18. The output terminals of gates 18 and 19 are respectively coupled to the inputs of NAND gate 20, with the converter and driver circuit 26 being coupled to amplify the output signal developed thereby and to apply such signal as modified at terminal 28.

Control signals, in the form of a logic 0 or a logic 1, are applied at the input of inverter 10, with a logic 0 being applied when a 60 Hz vertical deflection rate is needed for writing image signals representative of a moving object into storage, for subsequent transmission, or for reading image signals out of storage at the receiving location, for display. A logic 1, on the other hand, is applied at inverter 10 when the storage tube at the receiving location is to be written into at either the 7½ or 15 Hz rate, or when the storage tube at the transmitting location is to be read from at the 15 Hz scanning rate.

As is also shown, the output terminal of inverter 12 is coupled to one input of NAND gate 21, the second input of which is coupled to one output of a counter 30, operative from the synchronizing generator, to provide a 15 Hz pulse train. Such counter also provides pulses at a 7½ Hz rate to one input of NAND gate 22, the output terminal of which is coupled in conjunction with the output terminal of gate 21 to the two input terminals of NAND gate 23. This output terminal will be seen to couple to the input of the monostable multivibrator 24 to provide either the 7½ Hz or 15 Hz pulse train and NAND gate 19.

Control signals, also in the form of a logic 0 or a logic 1, are applied both at the input of inverter 12 and to the remaining input terminal of NAND gate 22, with a logic 0 being applied when a 15 Hz vertical deflection rate is desired, either to read information from the storage tube at the transmitting location onto the telephone line or to write such image signals into the storage tube at the receiving location. A logic 1, on the other hand, is impressed at inverter 12 and gate 22 when the vertical deflection rate is to be reduced to 7½ Hz to provide the increased resolution in reproducing stationary object images at the receiver, when improved image detail is desired.

As will be readily apparent, with a logic 0 applied at inverter 10, NAND gate 18 will provide a 60 Hz vertical deflection rate drive pulse to one input of NAND gate 20, to the other of which a logic 1 will be provided from NAND gate 19. The output of gate 20 will therefore be a 60 Hz rate vertical drive pulse which is amplified by the unit 26 and coupled as an output at terminal 28. With the application of a logic 1 to inverter 10, on the other hand, the output of NAND gate 18 will also be a logic 1, while the output of NAND gate 19 will be the vertical drive pulse from the multivibrator 24. The output of NAND gate 20, in this mode, will then be the 7½ or 15 Hz pulse, which is coupled to terminal 28 by means of driver amplifier 26.

As will also be readily apparent, with a logic 0 applied at inverter 12, NAND gate 21 will provide a 15 Hz vertical deflection rate drive pulse to one input of NAND gate 23, to the other input of which a logic 1 will be provided from NAND gate 22. The output of gate 23 will therefore be a 15 Hz vertical drive pulse, which is shaped by the multivibrator 24 and coupled as an input to NAND gate 19. With the application of a logic 1 to inverter 12, on the other hand, the output of NAND gate 21 will also be a logic 1, while the output of NAND gate 22 will be the 7½ Hz vertical drive pulse from the counter 30. The output of NAND gate 23, in this mode, will be the 7½ Hz rate pulse, which is shaped by the multivibrator 24 in its application to the input of NAND gate 19.

To summarize, with a logic 0 signal applied at inverter 10, a 60 Hz rate pulse train will be provided at output terminal 28. With a logic 1 signal applied at inverter 10 and with a logic 0 signal applied at inverter 12, a 15 Hz rate pulse train will be provided at terminal 28. With a logic 1 signal applied at inverter 10 and a logic 1 signal applied at inverter 12, a 7½ Hz rate pulse train will be developed at output terminal 28.

Figure 3:
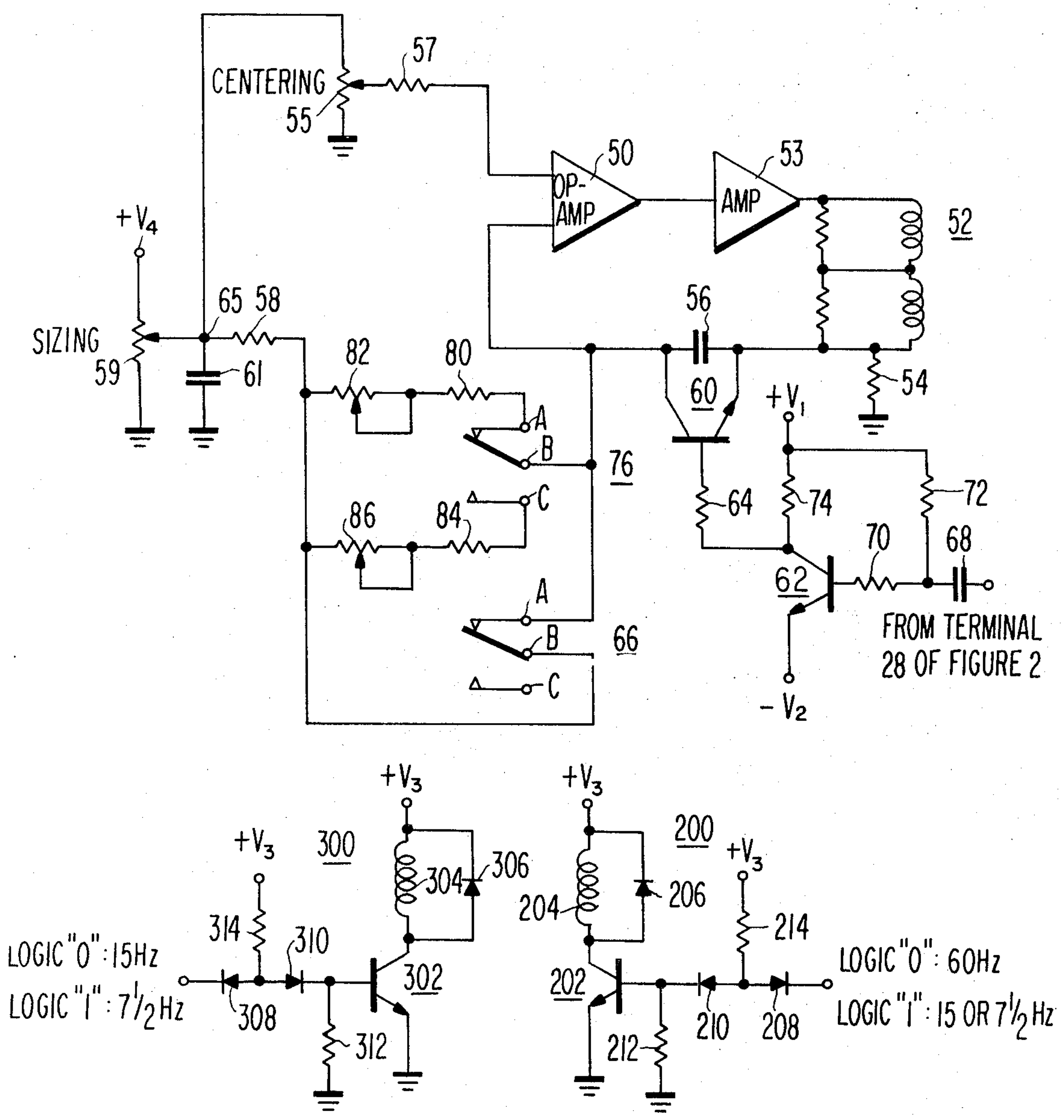
FIG. 3 shows a schematic diagram of apparatus responsive to these control pulses for setting the appropriate rate of vertical deflection signals to be applied to a storage tube for use either in the transmitting function or receive function of the system shown in FIG. 1.

The apparatus of FIG. 3 will be seen to include an operational amplifier 50, a set of vertical deflection coils 52, a current sampling resistor 54, an integrating capacitor 56, and a charge rate setting resistor 58. When interconnected with a pair of transistors 60, 62, as shown, the arrangement forms a sawtooth current generator.

In particular, the capacitor 56 is coupled between the collector and emitter electrodes of transistor 60 (illustrated as being of N-P-N type), to the base electrode of which the collector electrode of transistor 62 is coupled, via a resistor 64. The current sampling resistor 54 couples the emitter electrode of transistor 60 to a point of reference or ground potential, while the charge rate setting resistor 58 couples the collector electrode of that transistor via a normally closed switch 66 to a point of relatively fixed potential 65. A capacitor 68 and a resistor 70 serially couple the base electrode of transistor 62 to receive the 60 Hz, 15 Hz or 7½ Hz rate pulse train from terminal 28 of FIG. 2, with the junction of these two components being coupled by means of an additional resistor 72 to a source of operating potential $+V_1$, to which a resistor 74 is coupled from the collector electrode of transistor 62. With transistor 62 being also illustrated of N-P-N type, its emitter electrode is connected to a second source of operating potential $-V_2$.

As illustrated, the switch 66 is shown as being of a single pole, double throw variety, having terminals A, B, C—with terminal A being connected to the collector electrode of transistor 60 and with terminal B being connected to the end of resistor 58 which is remote from the point 65. A second, similar switch 76 is included, having its corresponding terminal B also connected to the collector electrode of transistor 60, but having its terminal A connected to the remote terminal of resistor 58 by means of a series combination of a fixed resistance 80 and a variable resistance 82. Terminal C of this second single pole, double throw switch is likewise coupled to the remote terminal of resistor 58—this time, the series combination including a fixed resistance 84 and a variable resistance 86.

Also shown in the arrangement of FIG. 3 are a pair of control circuits 200, 300, for operating the single pole double throw switches 66, 76, respectively. Each control circuit includes a transistor 202, 302 (shown as being of N-P-N polarity), with its emitter electrode connected to ground potential and with its collector electrode coupled to a source of operating potential $+V_3$ by means of a relay coil 204, 304. A semiconductor rectifier 206, 306 is coupled in parallel with its respective coil 204, 304, and is poled to bypass the coil when its associated transistor is non-conductive. With such non-conductive condition of the transistor, the respective single pole, double throw switch 66, 76 will be held in a "normally-closed" position, whereby its terminal B is connected to its terminal A.

Control over the conductive condition of transistors 202, 302 is effected by a pair of rectifiers coupled in back-to-back relationship—208, 210 for the control circuit 200 and 308, 310 for the control circuit 300. With the base electrode of the transistors 202, 302 being referenced to ground by a resistor 212, 312, with a further resistor 214, 314 coupling the junction between the rectifiers to the $+V_3$ potential source, and with control signals in the form of a logic 0 or a logic 1 applied at the cathode electrode of the rectifiers 208, 308, it will be understood that with the polarity of transistor illustrated, collector current flows through the relay coil 204, 304 upon the application of a logic 1 signal at this input control terminal, to change the condition of the switch 66, 76. Furthermore, the input signal applied to the cathode electrode of rectifier 208 will be appreciated to be the same control signal as applied at inverter 10 of FIG. 2, while the control signal applied to the cathode electrode of rectifier 308 will be appreciated to be the same control signal as applied at inverter 12 of that drawing.

The operational amplifer 50 has one of its two input terminals connected to the collector electrode of transistor 60 and its output terminal coupled to one terminal of an amplifier 53. Amplifier 53 is, in turn, coupled to one terminal of the vertical deflection coils 52—which, as illustrated, has its other terminal coupled to the current sampling resistor 54. The other input terminal of the operational amplifier 50 is shown coupled to the adjustable arm of a centering potentiometer 55, by means of a resistor 57, the potentiometer being coupled, as illustrated, between the point of fixed operating potential 65 and ground. A sizing potentiometer 59 is also coupled between a source of operating potential $+V_4$ and ground, with its adjustable arm connected to provide the fixed potential at point 65 to which the charge rate setting resistor 58 is connected. A capacitor 61 serves to bypass this point to ground.

Before considering the different operations of this apparatus, it will be noted that the operational amplifier 50 serves to establish a relatively fixed potential at the collector electrode of transistor 60. With the transistor 60 non-conductive, a relatively constant current flows through resistor 58—and, also, through one of the three possible coupling paths connecting it to the collector electrode of that transistor—due to the fixed voltage drop developed, and charges the capacitor 56 to provide a linear ramp of voltage through the deflection coils 52. The amplitude of the sawtooth ramp will be seen to be governed by the setting of potentiometer 59, to provide a size control in determining the extent of the target area scanned by the electron beam in the storage tube. As will be seen, this amplitude will remain unaffected, as the storage tube is switched from one mode of operation to the other. It will similarly be seen that the setting of the potentiometer 55 serves to impress a DC offset voltage to the sawtooth ramp, to serve as a centering control for the storage tube, as well.

In operation of the invention, these two controls 55 and 59 will normally be set and left alone. The operational amplifier 50 provides a fixed impedance at the collector electrode of transistor 60 and drives the output amplifier 53 for the deflection coils. With the sawtooth voltage being generated by the constant current flowing through resistor 58 and one of its three aforementioned paths to charge capacitor 56, it will be seen that when the mode of storage tube operation changes, both the slope and the duration of the deflection voltage will change accordingly.

Thus in operation, it will be seen that the application of a logic 0 signal to the cathode electrode 208 of FIG. 3 and to inverter 10 of FIG. 2 maintains switch 66 in its normally closed position—connecting its terminals A, B—and causes positive-going vertical rate pulses to be applied to the base electrode of transistor 62 at a 60 Hz rate. Such signals will serve to switch on transistor 60 at that 60 Hz rate, the vertical sweep interval thus being set in this manner. The charge stored on the integrator capacitor 56 will be reset at the end of these intervals, terminating the deflection sweep, and causing the rate of linear decay of the sawtooth current through the deflection coils to be a function of the value of the direct voltage at the point 65. The capacitor 56 discharges, during the interval of the triggering pulse, through the sampling resistor 54, and thereafter charges once again through resistor 58 at a slope dependent upon the current which flows through it and through the closed switch 66.

Although no control signal is applied in this step to the cathode electrode of rectifier 308, it will be seen that switch 76 continues in its normally closed position, connecting its terminals A and B; but any current which would tend to flow through the resistances 80, 82 at this time is bypassed around through switch 66. Potentiometer 59 and the fixed resistor 58, along with capacitor 56, then establishes the amplitude and slope of the sawtooth scan current which flows through the vertical deflection coils in this manner of operation. As was previously mentioned, application of this logic 0 signal to inverter 10 to obtain a 60 Hz sawtooth is utilized to write signal information into a storage tube prior to its transmission along the audio communications link, or to read such information from a storage tube at the receiving location for purposes of display.

The application of a logic 1 signal at inverter 10 and rectifier 208, on the other hand, renders transistor 202 conductive, to energize relay coil 204 and connect terminals B and C of switch 66. At the same time, the application of either a logic 0 or a logic 1 control signal to inverter 12 causes pulses to be applied to the base electrode of transistor 62 at either the 15 Hz or 7½ Hz rate, to switch on transistor 60 at the end of the then shortened vertical sweep. The charge stored on the integrator capacitor 56 is thus reset at an earlier time, to terminate the deflection sweep and make the rate of linear decay of the sawtooth current through the deflection coil be a function of the value of resistor 58 and any resistance coupled in series with it at that time. More particularly, with a logic 0 signal applied at the cathode electrode of rectifier 308, the transistor 302 continues to be non-conductive and terminals A snd B of switch 76 are continued closed. The capacitor 56 discharges, during this mode, again through sampling resistor 54, and thereafter charges through resistor 58 but at a slope which is now dependent upon the current which flows through that resistor and the resistances 80 and 82 in series with it. Resistor 82 in this respect permits adjustment of the slope of scan current through the deflection coils, which, with a logic 0 signal being then also applied at inverter 12, occurs at the 15 Hz scanning rate. Such arrangement will be seen useful where moving object image information is to be read from the storage tube at the transmitting location for application to the audio communications link and for writing such information signals into storage at the receiving location.

The application of logic 1 signal to the cathode electrode of rectifier 308, however, renders transistor 302 conductive, so that the energizing current flowing through relay coil 304 serves to connect terminals B and C of switch 76, instead of the previously connected terminals A and B. The resistance which then governs the charge slope for capacitor 56 includes the resistor 58 and the resistances 84, 86, with the resistor 86 being adjustable for desired slope of scan current through the deflection coils. The simultaneous application of a logic 1 signal to the inverter 12 causes the capacitor 56, in this mode, to be reset at the 7½ Hz scanning rate. Thus, the arrangement can be utilized where stationary object image information is transmitted directly from the television camera onto the audio link, and the storage tube at the receiving location is to be written into at this reduced rate for improved resolution of high detail pictures.

While there has been described what is considered to be a preferred manner of altering the duration and slope of vertical deflection signals for a storage tube, it will be readily apparent that other specific manners of making these changes can be accomplished by those skilled in the art without departing from the teachings herein. So long as the slope of the deflection signal is reduced and its duration is lengthened as one changes from the "high-resolution" mode of control of the storage tube (wherein it is scanned for writing at a 7 ½Hz rate), to the "low-resolution" mode (wherein it is scanned for reading or writing at a 15 Hz rate), to the more usual mode of operation where images are written into storage at the transmitting location or read from storage at the receiving location at a 60 Hz rate, complete control can be had over the scanning of the storage tube for its different modes of operation. In this manner, a single storage tube can be used in a telephone image transmission system both for "transmitting" and "receiving" functions, although not at the same time, and thereby effect a savings in the number of components required for operation of the telephone image transmission system.

What is claimed is:

1. In a telephone image transmission system of the type wherein a television camera, a display device and an audio communications link are interconnectable with a storage tube for transmitting television picture information signals representative of object images to a remote receiver location and in which said display device, said communications link and said storage tube are also interconnectable to reproduce television picture information signals representative of object images received by it from a remote transmitter location, the combination therewith of:

first means operative to intercouple the television camera, said storage tube and said audio communications link in the order named when said system is to transmit television picture information signals representative of object images;

second means for applying vertical deflection signals of a first scanning rate to said storage tube when said first means is operative to write said picture information signals into storage, and for applying vertical deflection signals of a second scanning rate to said storage tube when said first means is operative to read said picture information signals out of storage and onto said audio communications link;

third means operative to intercouple said audio communications link, said storage tube and said display device in the order named when said system is to reproduce television picture information signals representative of object images received by it from a remote transmitter location;

fourth means for applying vertical deflection signals of a third scanning rate to said storage tube when said third means is operative to write said picture information signals received along said audio communications link into storage, and for applying vertical deflection signals of a fourth scanning rate to said storage tube when said third means is operative to read said picture information signals out of storage for application to said display device;

fifth means operative to couple said storage tube with said television camera and said audio communications link when said system is to transmit television picture information signals representative of moving object images and to decouple said storage tube from the interconnections between said television camera and said audio communications link when said system is to transmit television picture information signals representative of stationary object images;

wherein said first and said fourth scanning rates are substantially equal, wherein said second means applies vertical deflection signals of a fifth scanning rate to said television camera when said fifth means is operative in the decoupling of said storage tube, and wherein said fourth means applies vertical deflection signals of a reduced scanning rate to said storage tube when said fifth means is operative in said decoupling mode to write said television picture information signals representative of stationary object images into storage at a rate substantially equal to said fifth scanning rate.

2. The combination of claim 1 wherein said fifth scanning rate is substantially one-half said fourth scanning rate.

3. The combination of claim 1 wherein said second and third scanning rates are also substantially equal.

4. The combination of claim 3 wherein said second and third scanning rates are reduced as compared to said first and fourth scanning rates.

5. The combination of claim 4 wherein said second and third scanning rates are one-fourth said first and fourth scanning rates.

6. The combination of claim 5 wherein said second means includes a resistance-capacitance time constant network for providing a sawtooth voltage waveform whose slope and duration are representative of the scanning rate of vertical deflection signals applied to said storage tube and wherein said second means is operative to reduce the current flowing through said resistance and lengthen the time of capacitor-charging when applying deflection signals of said second scanning rate in reading from said storage tube as compared to the application of deflection signals of said first scanning rate in writing into said storage tube.

7. The combination of claim 6 wherein said resistance-capacitance network includes a resistor, a capacitor, and a coupling path in series therewith, wherein a first transistor is included having collector and emitter electrodes across which said capacitor is connected, and wherein the base electrode of said transistor is biased to a conductive condition by a train of pulses having a repetition rate which corresponds to said first scanning rate when said system is to write television picture information signals representative of moving object images into said storage tube, and having a repetition rate which corresponds to said second scanning rate when said system is to read said television picture information signals representative of said object images out of said storage tube for application to said audio communications link.

* * * * *